(No Model.)
Z. T. GRAMME.
TRANSMISSION OF POWER BY ELECTRICITY.
No. 269,281. Patented Dec. 19, 1882.
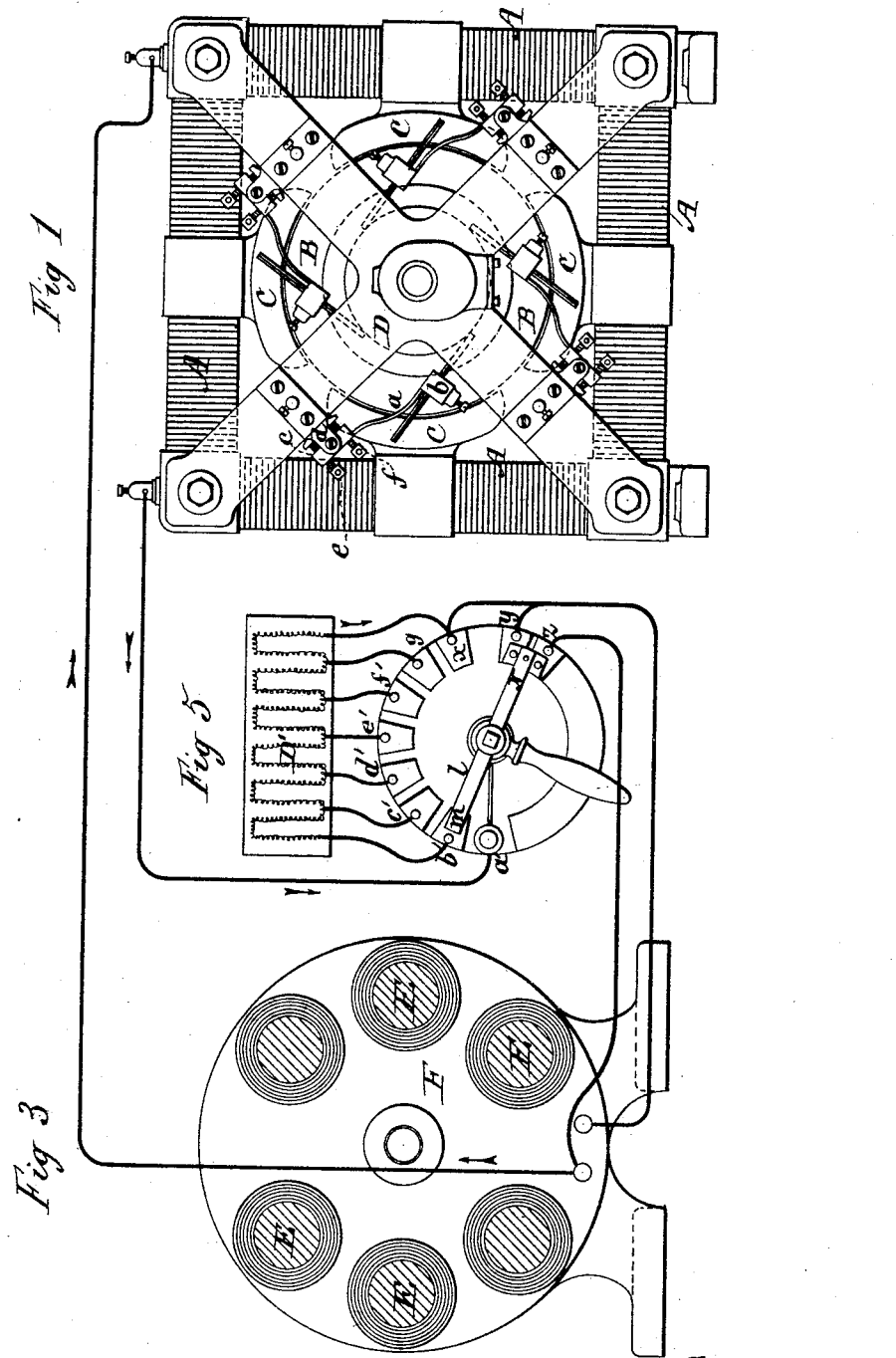
Witnesses
Inventor
Zénobe Théophile Gramme

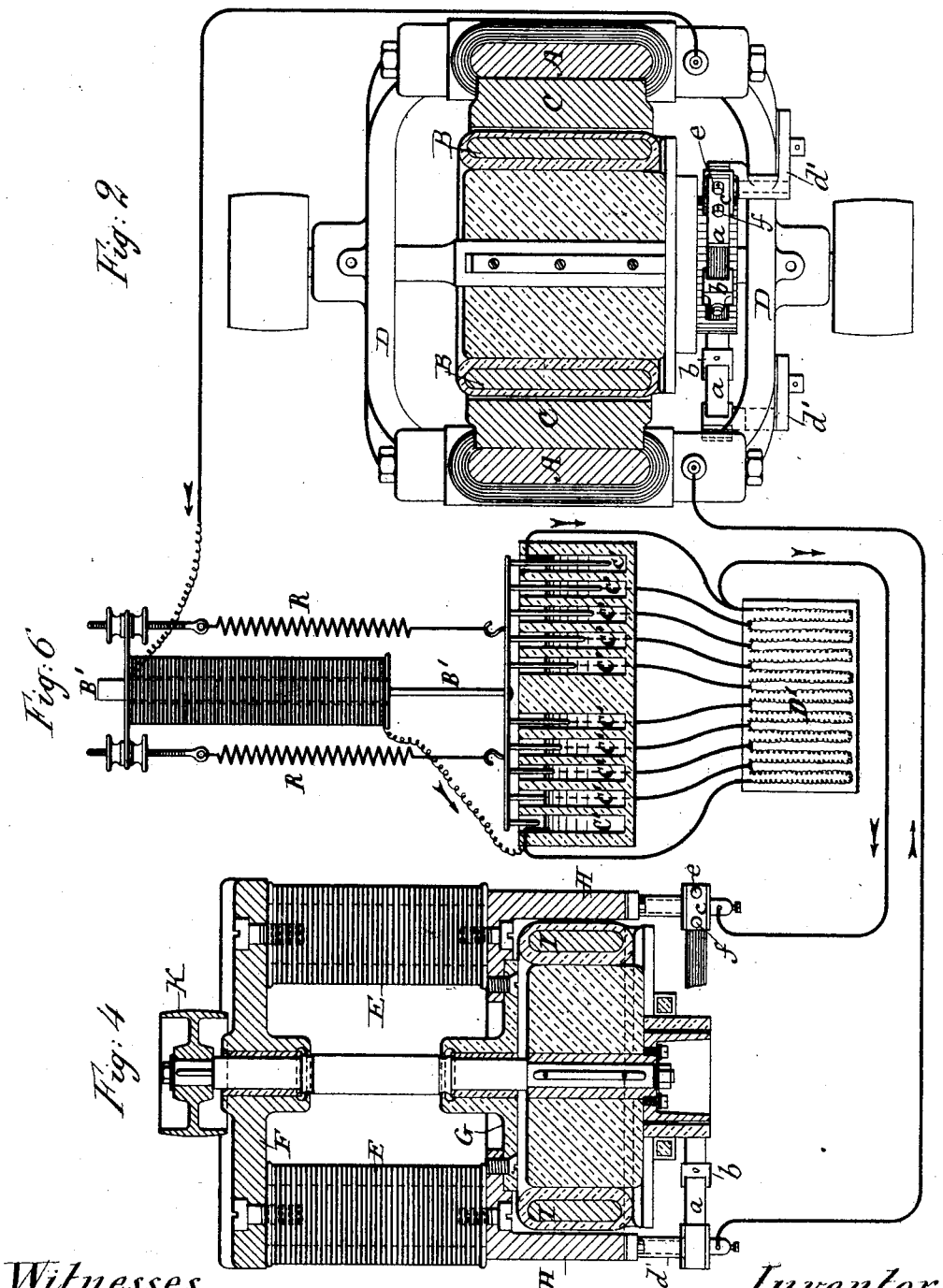

UNITED STATES PATENT OFFICE.

ZÉNOBE T. GRAMME, OF PARIS, FRANCE, ASSIGNOR TO ALFRED NIAUDET, OF SAME PLACE.

TRANSMISSION OF POWER BY ELECTRICITY.

SPECIFICATION forming part of Letters Patent No. 269,281, dated December 19, 1882.

Application filed October 9, 1882. (No model.)

*To all whom it may concern:*

Be it known that I, ZÉNOBE THÉOPHILE GRAMME, a citizen of France, residing at Paris, in the Department of the Seine, have invented new and useful Improvements in the Transmission of Power by Electricity, of which the following is a specification.

This invention has reference more particularly to a system for transferring motive power from one place to another by means of electricity. A system of this kind necessarily involves a generator or generators of electricity for converting mechanical into electrical energy, a conductor or conductors for conveying the electricity, and one or more translating devices or motors for reconverting the electrical into mechanical energy.

The invention comprises, first, certain new mechanical constructions and combinations of parts both in the generators and motors; second, a new construction and combination of generator or dynamo-electric machine and motor or electro-dynamic machine, whereby the latter is prevented from obtaining a dangerous velocity or "running away" when a belt breaks or the motor is otherwise relieved of its load; third, a new regulator or current-governor for varying or cutting off the current passing through it, so as to alter at will the speed of the motor or to stop it altogether; and, fourth, a new automatic regulator or current-governor for maintaining a uniform speed of the motor, notwithstanding variations in the weight of the load.

The accompanying drawings represent a generator and motor connected with each other and with regulators, and all constructed in accordance with the invention.

Figure 1 is an elevation of the generator; Fig. 2, a horizontal axial section of the same; Fig. 3, a vertical cross-section of the motor; Fig. 4, a horizontal axial section of the same; Fig. 5, an elevation of the regulator adapted for hand operation for varying the speed of the motor; and Fig. 6, an elevation, partly in vertical section, showing the automatic regulator for maintaining uniform speed.

The generator (see Figs. 1 and 2) has the inducing or field-of-force magnets A surrounding the periphery of the revolving armature or induced ring B, and there are a number of pole-pieces, C, symmetrically placed on the inside of the magnets. As shown, the inducing or field-magnets form a square, and have the pole-pieces at the middle of the sides. The armature-shaft is journaled in bearings in the cross-frames D, which are bolted to the magnets at the corners of the square. The armature or ring and the field-magnets are or may be of the ordinary or of other suitable construction. Instead of winding the armature or ring with wire or cotton tape to resist the effect of centrifugal force, it is preferred to use linen or flax twine, it having been found to be better adapted to the purpose. The coils of the armature or ring also are or may be connected with the insulated strips of the commutator-disk in any suitable way. Each of the collecting-brushes is held in a clamp, $b$, at the outer or free end of a flexible carrying-arm, $a$, which is attached at the opposite end to the pivoted block $c$. This block $c$ is pivoted in ears $d$ of a holder, $d'$, which is bolted to an arm of the cross-frame D adjacent to the commutator-disk, and it is adjusted and held in place by the screws $e$ $f$. By turning said screws the pressure of the brushes against the commutator-disk can be regulated. The arms $a$ being elastic and yielding aids in maintaining an even and close contact between the brushes and the commutator-disk, notwithstanding irregularities in said devices. The said arms can, however, be made rigid, if desired, the elasticity of the brushes themselves being sufficient. By releasing the pressure of the set-screws in the clamps $b$ the brushes can be set forward to compensate for wear.

The motor or electro-dynamic machine, Figs. 3 and 4, has a number of parallel magnets, E, fixed at one end to a disk, F, and provided with pole-pieces H at the other. A disk, G, of non-magnetic material—such as bronze—is screwed to the pole-pieces, so as to bind them together. The armature-shaft is journaled in bearings in the disks F G. It carries the armature or ring I and the pulley K for operating other machines at opposite ends. The pole-pieces are cut away on the inside or are made thin, so that the ring I revolves in front of the axes of the magnet. The collecting-brushes for the commutator are supported and adjusted as before described with reference to the generator. The parts being lettered the same as in Figs. 1 and 2, no further description is necessary.

In order to prevent the motor from attaining a dangerous velocity when it is suddenly released from work by the breaking of the band on the driving-pulley or otherwise, the following disposition is adopted: In the generator materials which retain but a feeble magnetism—such as wrought-iron, soft steel, malleable iron, cobalt, and the like—are used for the cores of the field-magnets, for the pole pieces, and even in certain cases for the bed and cross-frames, while in the motor the same parts are made of materials having large residual magnetism, such as cast-iron, hard steel, tempered steel, and the like. When an electric motor, for any cause, is left free to revolve without work, the generator continuing to operate, the velocity tends to accelerate, and unless this tendency to acceleration is checked the velocity is liable to become dangerous; but almost immediately the reaction of the motor makes itself felt at the generator and the current becomes very feeble. This current, feeble though it be, is apt to impart an exaggerated velocity, unless, as above indicated, the residual magnetism of the generator is small and of the motor sufficiently large. Under these circumstances the speed slackens and the motor assumes a regular velocity of rotation, which is sometimes inferior to what it had originally. The action takes places automatically without it being necessary to touch the generator or the motor, and the energy imparted to the generator from the initial source of power is in proportion to the new effect produced. The phenomenon is the more remarkable in that the motor, having more residual magnetism, has a greater effect than the generator; or, in other words, if the expression may be used, the "reaction" of the current upon itself is more energetic than the original which produced it.

The current-regulators, Figs. 5 and 6, for use in connection with the motor, consist each of a rheostat, $D'$, and a commutator for connecting more or less of its coils in circuit. As shown in Fig. 5, the several resistances, parts, or coils of the rheostat are connected with contact-plates $b'$ $c'$ $d'$ $e'$ $f'$ $g$ $x$, set in the body of the commutator, which is of insulating material. There are two additional contact-plates, $y z$, which are connected with the poles of the motor. The contact-plate $x$ is connected with the conductor running from the plate $y$. The binding-post $a$, which is connected with the conductor coming direct from the generator, is in electrical communication with the flat contact-spring $l\ m$, through a spring which bears against the arbor on which said contact-spring is fastened. The arm N, also attached to the said arbor, carries a plate, (insulated from said arm,) which, when in the position shown, connects the plates $y z$, so as to cut out the motor by short-circuiting it at the same time that all the coils of the rheostat are connected in circuit. By turning the handle of the commutator the arm N is moved to break the connection between the plates $y z$ and the spring $l\ m$ to make contact with one or other of the plates $c'$ $d'$ $e'$ $f'$ $g$ $x$, and thus cut out one or more or all of the rheostat-coils. The current of course varies inversely with the number of rheostat-coils in circuit, and by regulating this the speed of the motor can be varied at will. The regulator is also available to vary the current according to the work to be done. The object in having the plates $y z$ is to avoid having a motor when not in use affect the generator by producing a counter electro-motive force, and thus interfere with other motors supplied by the same generator.

In Fig. 6 the coils of the rheostat $D'$ are connected with a series of insulated mercury-cups, $C'$, and an electro-magnet or solenoid having a central sliding armature-core, $B'$, connects in or cuts out the said coils, according as the current through the electro-magnet diminishes or increases. A frame of conducting material having a number of points of unequal length is attached to the core $B'$, the said points as the frame is lowered or raised dipping into or leaving *seriatim* the mercury in the cups. The tension-springs R are antagonistic to the force of the magnet or solenoid and serve to balance its attraction. As shown, the springs tend to lift the frame, the attraction of the magnet or solenoid to force it down. The electro-magnet or solenoid is included in the circuit of the motor, so that its action is automatic. When the work to be done by the motor diminishes the speed of the armature increases and the strength of the electric current is diminished. The core $B'$, with its attached frame, therefore is lifted by the springs, and successively connects in the coils of the rheostat by breaking the short circuits until the motor resumes its normal speed and equilibrium is established. When, on the contrary, the load put on the motor is increased, the rotation of the armature diminishes, the current increases, the magnet depresses the core R and its frame, and cuts out by short-circuiting the resistances or coils until the velocity increases to its normal rate and equilibrium is established. By varying the tension of the springs R by the screws provided for the purpose the regulator or governor may be adapted to maintain constant the speed of the motor at a greater or less velocity.

Modifications may be made in the details of construction without departing from the spirit of the invention, and portions of the invention may be separately used. For example, as shown, the electrical machine shown in Figs. 1 and 2 is used as a generator and that shown in Figs. 3 and 4 as a motor, and they are designed for use in this way, as each contains special advantages for such use; but it is obvious that machines of either construction could be used both as generator and motor. Two such machines as shown in Figs. 3 and 4 could be connected, one serving as a generator or dynamo-electric machine, the other as a motor or electro-dynamic machine, and so, also, of machines of the construction illustrated in Figs. 1 and 2.

In the current regulator or governor shown in Fig. 6, instead of providing the conducting-frame with pins of varying length, the mercury in the several cups may be kept at different heights; or the magnetor solenoid may be connected with a commutator such as shown in Fig. 5.

Two motors such as shown in Figs. 3 and 4 could be placed end to end and have a common pulley between them. The number of magnets can be increased or diminished at will. The dimensions of the machine would be in proportion to the power to be conveyed.

Having now fully described my said invention and the manner of carrying the same into effect, what I claim is—

1. In an electrical machine, and in combination with the commutator-disk thereof, the collecting-brushes carried by and longitudinally adjustable in clamps, and the elastic arms carrying said clamps, substantially as described.

2. The combination of a collecting-brush, a clamp therefor, an arm carrying the clamp, a tilting block to which the said arm is attached, and the two set-screws on opposite sides of the pivot of the block, for adjusting the position of said block, substantially as described.

3. In a system for transferring power by electricity, a dynamo-electric machine having the cores of the field-magnets and like parts formed of material retaining but little residual magnetism, in combination with a motor or electro-dynamic machine whereof the cores and like parts retain a large supply of magnetism, substantially as described.

4. The combination, with a dynamo-electric machine, a motor, a rheostat, and a commutator or switch, of an electro-magnet included in the circuit and connected with said commutator or switch, as indicated, so that as the current increases portions of the rheostat are successively cut out, and as the current diminishes the reverse operation takes place, substantially as described.

5. The combination, with an electric motor or electro-dynamic machine and a rheostat, of a commutator or switch having a series of contacts connected with parts of the rheostat, and a pair of contacts connected with the poles of the motor, and movable contacts connected as explained, so that when the whole of the rheostat is included in circuit the motor is cut out, but is connected in when a portion of said rheostat less than the whole is included, substantially as described.

6. The combination, with the series of parallel magnets, of the pole-piece, made thin or cut away on the inside, and the armature or ring revolving within said poles and in front of the axes of said magnets, substantially as described.

7. The combination of the series of parallel magnets, their pole-pieces, the disks at opposite ends of the magnets, the armature-shaft journaled in said disks, and the armature or ring carried at one end of said shaft between the pole-pieces, substantially as described.

In testimony whereof I have hereunto set my hand in the presence of two subscribing witnesses.

ZÉNOBE THÉOPHILE GRAMME.

Witnesses:
EMILE BARRAULT,
ROBT. M. HOOPER.